Figure 1:
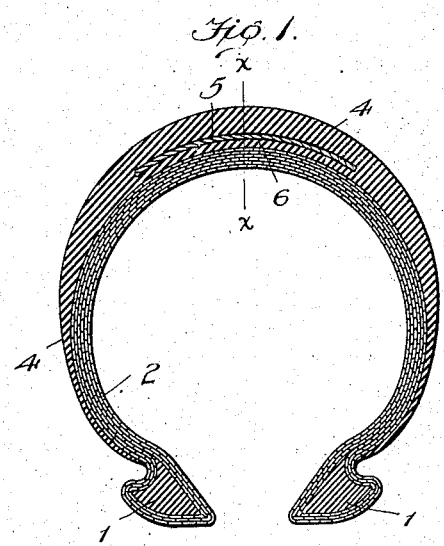

L. T. PETERSEN.
ELASTIC TIRE FOR VEHICLE WHEELS.
APPLICATION FILED MAR. 31, 1915.

1,152,756.

Patented Sept. 7, 1915.

Witness
Edwin L. Bradford

Inventor
L. T. Petersen,
By Wm. E. Dye,
Attorney

UNITED STATES PATENT OFFICE.

LUDVIG T. PETERSEN, OF YOUNGSTOWN, OHIO, ASSIGNOR TO THE REPUBLIC RUBBER COMPANY, OF YOUNGSTOWN, OHIO, A CORPORATION OF OHIO.

ELASTIC TIRE FOR VEHICLE-WHEELS.

1,152,756.

Specification of Letters Patent.

Patented Sept. 7, 1915.

Application filed March 31, 1915. Serial No. 18,345.

*To all whom it may concern:*

Be it known that I, LUDVIG T. PETERSEN, a citizen of the United States, residing at Youngstown, in the county of Mahoning and State of Ohio, have invented certain new and useful Improvements in Elastic Tires for Vehicle-Wheels; and I do hereby declare the following to be a full, clear, and exact description of the invention, such as will enable others skilled in the art to which it appertains to make and use the same.

In its broadest sense my present invention has reference to elastic tires for vehicle wheels, but more particularly stated it relates to the breaker strip which usually is employed in the construction of outer casings for pneumatic tires, and extends circumferentially around same being embedded in the tread portion thereof.

Heretofore woven cotton fabric is the material of which breaker strips have been formed, and it has been customary in tire building to so position these strips that their warp threads or cords are longitudinally positioned and arranged, so as to circumscribe the tire carcass. In this ordinary arrangement of woven breaker strips it is well understood that neither the longitudinal warp, nor the transverse weft cords are individually embedded in the tread portion of the tire, the fabric strip as a whole, however, is so embedded, and as a consequence is more likely to become separated, or torn away, from the body of the structure when subjected to severe lateral strains so frequently caused by the skidding of heavy cars. It is also well understood that such sheet-like interwoven material necessarily detracts from the pliability or resiliency of the tread portion of a tire, and in the event of a rupture causes the tire to deteriorate more rapidly than would be the case if no breaker strip whatever was employed, because obviously, water entering through such rupture is carried by capillary attraction along the longitudinal warp cords and thence to the transversely arranged interwoven cords, until all are more or less rotted out and separation of the tread portion of the tire results.

To overcome the aforesaid disadvantages and imperfections of woven breaker strips therefore is one object of the present invention, and, particularly in the event of ruptures or punctures of the breaker strip, is this invention designed, arranged and adapted to confine the damage to those of the transverse cords which are actually cut or broken.

Another important object of the present invention is that of permitting at times a slight spreading or circumferential separation of adjacent transverse cords of which the improved breaker strip is composed, while passing over comparatively small or pointed stones or similar road obstructions. Obviously, this does not occur with woven fabric breaker strips the transverse cords of which are practically tied together by the longitudinal or warp cords, and as a consequence breakage of the strip is more likely to follow, or if it resists penetration, such objects must then be surmounted by the tire itself thus materially decreasing its efficiency in the matter of speed developed from a given motive power.

Another object of the present invention is the facility, accuracy and precision with which breaker strips may be applied to a tire carcass in the course of construction, with absolutely no overlap at the ends of said strip such as is common in woven fabric strips.

With these and other objects and advantages in view the present invention will now be more particularly described and finally set forth in the claims appended hereto.

Figure 2:
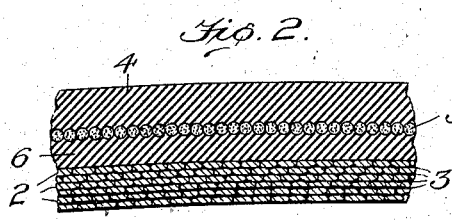
Figure 3:
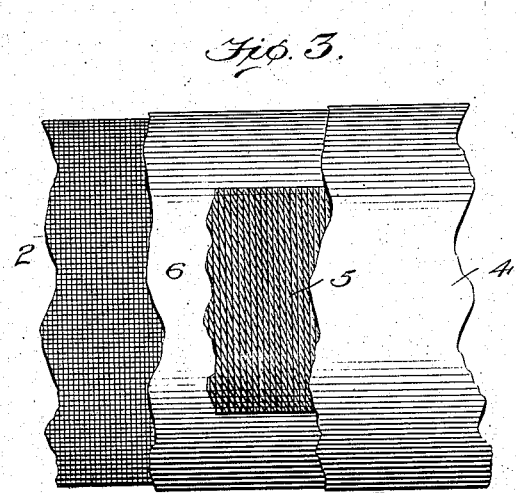

In the accompanying drawings which form part of this application and whereon corresponding letters indicate like parts in the several views: Figure 1 represents a section taken transversely through a pneumatic tire casing complete, showing one transverse cord of a breaker strip embedded in its tread portion. Fig. 2 is a relatively enlarged fragmentary sectional view taken on the line *x—x* of Fig. 1, showing a tire body and tread portion in longitudinal section, and also embedded in said tread portion a breaker strip composed of a continuous series of parallel and adjacent transversely arranged individual cords, and Fig.

3 is likewise a fragmentary view showing in plan the tread surface of a tire casing, which, broken away, discloses a portion of the within contained improved breaker strip, within which is to be seen a portion of a cushion layer for said strip, and within the latter the fabric, base or body of the structure.

Reference being had to the drawings the numerals 1 indicate ordinary clencher beads of a tire casing which, as usual, are non-stretchable, and of annular form to be received between the flanges of a wheel rim (not shown). Inclosing the said beads and projecting radially therefrom is an annular and substantially tubular tire body or base, constructed of suitable superimposed layers of woven fabric 2 with interposed skim layers 3 of rubber or other elastic bonding material. When of woven fabric this body 2 is preferably built up from layers of sea-island cotton cut on the bias to facilitate stretching into tubular form, but obviously the said body portion may be, and frequently is, constructed wholly of rubberized threads or cords, and also of bands wound or otherwise applied, in superimposed layers, but in any event the said body portion while more or less flexible should be substantially non-stretchable. Surrounding the said base or body portion 2 and intimately connected therewith by the vulcanizing process, is the elastic tread portion 4 of the structure, preferably of high grade para rubber, and like the body 2 built up in layers or sheets preparatory to vulcanization, by which process they are united into a homogeneous mass, as shown by the drawings.

Embedded directly in the tread portion 4, as best shown by Fig. 1, is a breaker strip 5 consisting of a continuous series of individual cords transversely arranged and collectively encircling the structure; while immediately inside of this is an annular elastic cushion 6, upon which said breaker strip rests, while this in turn is cohesively attached to the periphery of the tire body 2. Thus it will be seen that the said breaker strip 5 is formed of a series of parallel adjacent cords preferably of uniform length, which, collectively, circumscribe the cushion 6 to form a continuous breaker strip without overlapping ends.

In practice the individual rubberized cords 5 are calendered into sheet form with enough crude rubber to bond them together, these sheets are then cut into strips of proper width, and applied to a tire carcass in the process of building, the same as would be a ply of rubber, except that they do not extend to the beads 1, and are applied without stretching. After having once thus completely encircled the breaker-strip-cushion 6, it will be observed that said strip may be neatly separated, or severed, between two adjacent cords, so that its extremities may be exactly joined without overlapping regardless of the diameter of the tire, and moreover this may be done with great accuracy and precision.

Although individual cords have hereinbefore been referred to as the material of which the improved breaker strip is formed, this term should be understood to include any material or materials capable of accomplishing substantially the same results in substantially the same manner. Moreover, this invention is regarded, and understood to be, broad enough to include any arrangement of the elements 5 so long as they extend more in a transverse than a longitudinal direction.

The use and operation of my present invention have hereinbefore been outlined, and beyond this are so obvious to persons skilled in the art, that a detailed statement thereof would seem to be unnecessary.

Having thus described my invention what I now claim and desire to secure by Letters Patent is:

1. An elastic tire for wheels having embedded directly in the material of which its tread portion is formed a series of cords transversely arranged to constitute a breaker-strip.

2. An elastic tire for wheels having embedded directly in the material of which its tread portion is formed a series of parallel cords transversely arranged to constitute a breaker-strip.

3. An elastic tire for wheels having embedded directly in the material of which its tread portion is formed a series of individual cords transversely arranged and collectively extending around the circumference of the tire to constitute a breaker-strip.

4. An elastic tire for wheels having embedded directly in the material of which its tread portion is formed a series of individual cords of uniform length transversely arranged and cohesively joined to constitute a breaker-strip.

5. An elastic tire for wheels having embedded directly in the material of which its tread portion is formed a breaker strip composed of transverse cords crossing said tread portion at an angle and collectively encircling the structure.

6. An elastic tire for wheels comprising an annular outer casing having embedded directly in the material of which its tread portion is formed a series of individual cords crossing said tread portion at an angle and collectively encircling the same to constitute a breaker strip.

7. An elastic tire for wheels of annular and approximately tubular form, comprising a body of non-elastic material, an elastic cushion encircling said body, an outer elastic tread portion, and a breaker-strip interposed between said cushion and tread portion formed of a series of cords transversely arranged and collectively encircling the structure.

In testimony whereof I affix my signature, in presence of two subscribing witnesses.

LUDVIG T. PETERSEN.

Witnesses:
 TOD J. MELL,
 S. E. BROWN.